(12) United States Patent
Kashiwazaki et al.

(10) Patent No.: US 6,248,482 B1
(45) Date of Patent: Jun. 19, 2001

(54) INK, COLOR FILTER, LIQUID CRYSTAL PANEL, AND COMPUTER, AND PROCESS FOR PRODUCING COLOR FILTER

(75) Inventors: Akio Kashiwazaki, Yokohama; Katsuhiro Shirota, Kawasaki; Koichiro Nakazawa, Tokyo; Masashi Hirose, Hachioji; Mayumi Yokoyama, Yokohama; Yoshihisa Yamashita, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/276,514

(22) Filed: Mar. 25, 1999

(30) Foreign Application Priority Data

Mar. 31, 1998 (JP) .................................. 10-086227

(51) Int. Cl.$^7$ .............................. G02B 5/20; G02F 1/1335
(52) U.S. Cl. .............................. 430/7; 106/31.5; 347/107; 349/106
(58) Field of Search .................. 430/7; 106/31.5, 106/31.46; 347/106, 107; 349/106

(56) References Cited

U.S. PATENT DOCUMENTS

| | | | |
|---|---|---|---|
| 4,804,411 | 2/1989 | Eida et al. | 106/22 |
| 4,864,324 | 9/1989 | Shirota et al. | 346/1.1 |
| 5,074,914 | 12/1991 | Shirota et al. | 106/22 |
| 5,110,356 | 5/1992 | Shirota et al. | 106/22 |
| 5,123,960 | 6/1992 | Shirota et al. | 106/22 |
| 5,135,570 | 8/1992 | Eida et al. | 106/22 |
| 5,135,571 | 8/1992 | Shirota et al. | 106/22 |
| 5,139,573 | 8/1992 | Yamamoto et al. | 106/22 |
| 5,216,437 | 6/1993 | Yamamoto et al. | 346/1.1 |
| 5,231,417 | 7/1993 | Shirota et al. | 346/1.1 |
| 5,482,546 | 1/1996 | Eida | 106/22 |
| 5,593,757 | 1/1997 | Kashiwazaki et al. | 428/195 |

FOREIGN PATENT DOCUMENTS

| | | |
|---|---|---|
| 634 457 | 1/1995 | (EP) . |
| 703 471 | 3/1996 | (EP) . |
| 57-067677 * | 4/1982 | (JP) . |
| 59-75205 | 4/1984 | (JP) . |
| 60-067576 | 4/1985 | (JP) . |
| 60-199077 * | 10/1985 | (JP) . |
| 63-235901 | 9/1988 | (JP) . |
| 1-217302 | 8/1989 | (JP) . |
| 4-123005 | 4/1992 | (JP) . |
| 8211219 | 8/1996 | (JP) . |
| 8-211219 * | 8/1996 | (JP) . |
| 9291240 | 11/1997 | (JP) . |

* cited by examiner

*Primary Examiner*—John McPherson
(74) *Attorney, Agent, or Firm*—Fitzpatrick, Cella, Harper & Scinto

(57) ABSTRACT

Provided is a novel ink which is suitable for producing a color filter by use of an ink-jet system. The ink comprises a pyrazolone dye of the general formula (I):

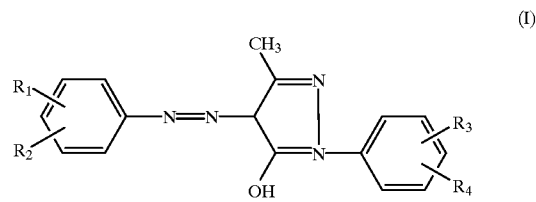

wherein $R_1$ and $R_2$ are each independently a hydrogen atom, an OH group, a halogen atom, a linear or branched alkyl group having 1 to 5 carbon atoms, a nitro group, a $CF_3$ group or an $SO_3(M1)$ group, where M1 is an alkali metal or $NH_4$; both $R_3$ and $R_4$ are an $SO_3(M2)$ group, where M2 is an alkali metal or $NH_4$.

37 Claims, 6 Drawing Sheets

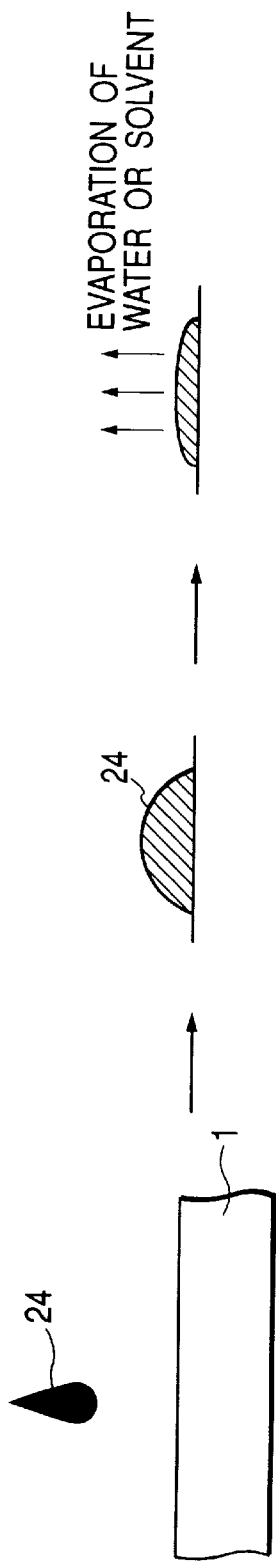
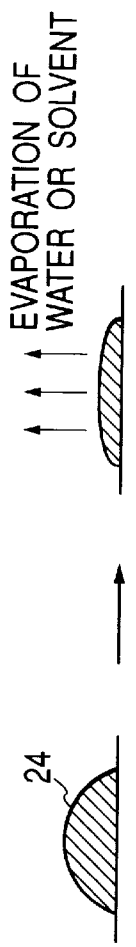
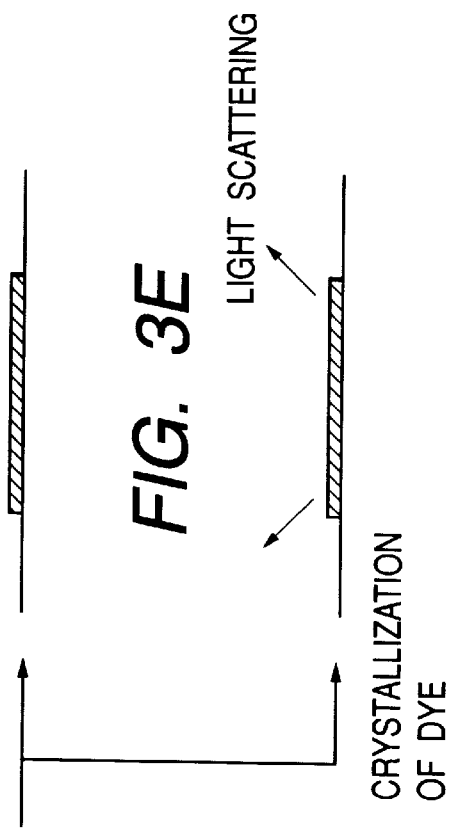

INK, COLOR FILTER, LIQUID CRYSTAL PANEL, AND COMPUTER, AND PROCESS FOR PRODUCING COLOR FILTER

BACKGROUND OF THE INVENTION

1. Field of the Invention

The present invention relates to an ink for ink-jet recording, a color filter of a liquid crystal color display device used in color televisions, personal computers and the like, a process for producing the color filter, and a liquid crystal panel employing the color filter.

2. Related Background Art

A color filter is one of the important parts of a liquid crystal color display device. This filter is so constituted that many pixels of three primary colors of red (R), green (G) and blue (B) are arranged repeatedly. With development of personal computers, especially portable personal computers, liquid crystal display devices, in particular liquid crystal color display devices, are increasingly in demand. For further popularization thereof, the cost of the liquid crystal display device, especially the relatively high cost of the color filter, should be reduced. For reducing the cost of the color filter while retaining the required quality, various color filter production processes have been investigated. Typical production processes of color filters are explained below.

A first process employed most widely is a dyeing process. In this process, a water-soluble polymer for dyeing is sensitized by addition of a photosensitive material, the sensitized polymer is patterned by photolithography in a desired shape on a transparent base plate, and the obtained pattern is dyed in a dyeing bath to obtain a colored pattern. This operation is repeated three times to produce an RGB color filter.

A second process employed relatively widely is a pigment dispersion process. This process is replacing the above dyeing process. In this process, a photosensitive resin layer containing a pigment dispersed therein is formed on a base plate, and the resin layer is patterned to obtain a pattern for one color. This operation is repeated three times to form an RGB color filter.

A third process is an electrodeposition process. In this process, a transparent electrode is patterned on a base plate, and the patterned base plate is immersed in a electrodeposition solution containing a pigment, a resin, an electrolyte and so forth to deposit a first color. This operation is repeated three times to form RGB color layers and then the colored layers are calcined, thereby forming a color filter.

A fourth process is a printing process. In this process, paints containing a pigment and a thermosetting resin are applied onto a base plate for each of the three colors of R, G and B, and the colored resin layer is cured by heating to form an RGB color filter.

The above processes, however, have many unsolved problems, as below. For example, in any of the above processes, a protection layer is generally formed on the colored layer. And what is common to these processes is that it is necessary to repeat the same operation three times for formation of R, G and B, which increases the production cost inevitably. The larger the number of steps, the lower would be the yield, disadvantageously. Further, the third process is not applicable to a TFT color display device owing to the limited formable pattern with the present technical level. The fourth process has drawbacks of low resolution and poor smoothness, and thus is not suitable for fine-pitch pattern.

To offset these disadvantages, ink-jet systems are proposed for producing a color filter (see Japanese Patent Application Laid-Open Nos. 59-75205, 63-235901, 1-217302, 4-123005, etc.). In these systems, coloring liquids (hereinafter referred to as an "ink") containing respectively a dyestuff of red (R), green (G) or blue (B) are ejected through a nozzle onto a filter base plate, and the deposited inks are dried to form pixels, thereby forming a color filter. With this system, the colored layers of R, G and B can be formed in one step, and the inks can be deposited selectively on pixel formation portions without waste of inks, so that productivity can be improved and production cost can be reduced.

The ink for color filter production by the ink-jet system desirably satisfies at a higher level the requirements for characteristics shown below:

(a) high transparency of the pixels (colored portions) of the color filter, (b) less areal spreading of the pixels with lapse of time (hereinafter referred to as "bleeding"), (c) high adhesiveness of the pixels, (d) high light-fastness of the pixels of the color filter, and (e) high ejection stability in ink-jet recording system.

The production of a color filter by use of an ink-jet system is greatly different from conventional color filter production processes, for example as shown in FIGS. 3A to 3E, in that an ink 24 containing a dye in a high concentration is applied selectively onto pixel portions on a base plate 1 (FIG. 3A) and a solvent or the dispersing medium (water, an organic solvent, etc.) is evaporated to form pixels (FIG. 3C). FIG. 3B shows a state where the ink 24 is just applied and FIG. 3D shows a state where a pixel is normally formed. However, as shown in FIG. 3E, it has been found by the inventors of the present invention that the dyestuff may crystallize out from the ink 24 applied on the base plate during drying to lower a transparency of the formed pixels, or may cause bleeding of the pixels by migration of the pixel-forming dye with lapse of time owing to incomplete evaporation of the solvent. The remaining residual solvent in the pixels may lower the adhesiveness to the base plate by an interaction with the base plate, or may impair light-fastness owing to influence of active oxygen formed by thermal decomposition. Therefore, it is preferable that the ink for color filter formation preferably should satisfy the above requirements (a) to (d) at a high level. Further, it is needless to say that the ink for an ink-jet system should be ejected stably. The inventors of the present invention have investigated inks having the above characteristics. Consequently, it have been found that an ink comprising a pyrazolone dye satisfies the requirements for characteristics (a) to (e) mentioned above at a higher level as an ink-jet ink for formation of a green pixel in a color filter.

SUMMARY OF THE INVENTION

The present invention has been accomplished on the basis of the above findings.

An object of the present invention is to provide an ink satisfying the above characteristics (a) to (e) at a higher level.

Another object of the present invention is to provide a color filter having green color filter portions having high transparency, causing very little bleeding, and having excellent adhesiveness.

Still another object of the present invention is to provide a process for producing a color filter which has green filter portions having high transparency, causing less bleeding, and having high adhesiveness, at a low production cost.

A further object of the present invention is to provide a liquid crystal panel of high quality.

A still further object of the present invention is to provide a computer having an image display device of high quality.

A still further object of the present invention is to provide a process for producing a color filter which has highly transparent green filter portions, causing less bleeding, and having high adhesiveness.

The above objects can be achieved by the present invention mentioned below.

According to the first aspect of the present invention, there is provided an ink-jet recording ink comprising a pyrazolone dye of the general formula (I):

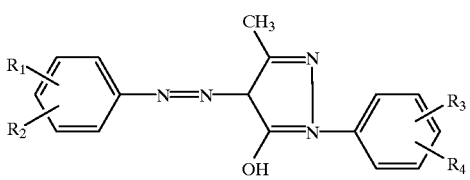

(I)

wherein $R_1$ and $R_2$ are each independently a hydrogen atom, an OH group, a halogen atom, a linear or branched alkyl group having 1 to 5 carbon atoms, a nitro group, a $CF_3$ group and an $SO_3(M1)$ group, where M1 is an alkali metal or $NH_4$; both $R_3$ and $R_4$ are an $SO_3(M2)$ group, where M2 is an alkali metal or $NH_4$.

This ink satisfies the above requirements for the properties (a) to (e) at a high level.

According to another aspect of the present invention, there is provided a color filter comprising a light-transmissive base plate and colored pixels on the base plate, wherein the colored pixel contains a pyrazolone dye of the above general formula (I).

According to still another aspect of the present invention, there is provided a color filter comprising a light-transmissive base plate and colored pixels on the base plate, wherein at least one of the colored pixels contains a pyrazolone dye of the above general formula (I). Due to adopting such a constitution it is possible to produce a color filter with green colored pixels having excellent characteristics.

According to further aspect of the present invention, there is provided further a liquid crystal panel comprising, for example, a color filter and a panel base plate. The color filter has a light transmissive base plate and colored pixels placed at prescribed positions on the base plate. The colored pixel contains a pyrazolone dye of the general formula (I). The panel base plate is placed in opposition to the color filter. A liquid crystal compound is enclosed between the color filter and the panel base plate. Due to adopting such a constitution it is possible to produce a liquid crystal panel having excellent characteristics.

According to still another aspect of the present invention, there is provided a computer comprising, for example, a liquid crystal panel as an image display device which has a color filter, an opposing panel base plate, and a liquid crystal compound enclosed therebetween, in which the color filter has a light-transmissive base plate and colored pixels placed on the base plate, wherein the colored pixel contains a pyrazolone dye of the general formula (I). Due to adopting such a constitution it is possible to produce a computer provided with an image display device having excellent characteristics.

According to another aspect of the present invention, there is provided a process for producing a color filter provided with colored pixels on a light-transmissive base plate comprising the step of ejecting a recording ink containing a pyrazolone dye of the general formula (I) onto a light-transmissive base plate by an ink-jet system to deposit the ink on prescribed positions to form colored pixels there.

According to still another aspect of the present invention, there is also provided a process for producing a color filter provided with colored pixels on a light-transmissive base plate comprising the step of ejecting an ink for ink-jet recording containing a pyrazolone dye of the general formula (I) onto a light-transmissive base plate by an ink-jet system to deposit the ink on prescribed positions to form at least one of the colored pixels there. Due to adopting such a constitution it is possible to produce effectively a color filter having excellent characteristics, at a low production cost.

According to a still further aspect of the present invention, there is further provided a process for producing a color filter provided with colored pixels on a light-transmissive base plate comprising the steps of ejecting an ink for ink-jet recording containing a pyrazolone dye of the general formula (I) and a curable resin onto a light-transmissive base plate by an ink-jet system to deposit the ink on a prescribed position; and curing the curable resin in the ink to form a colored pixel there. When adopting such a constitution, there can be exhibited an effect that it is possible to produce more effectively a color filter without providing a resin layer on the light-transmissive base plate.

BRIEF DESCRIPTION OF THE DRAWINGS

FIGS. 3A, 3B, 3C, 3D and 3E illustrate a transient state during formation of a pixel of a color filter by an ink-jet system.

DESCRIPTION OF THE PREFERRED EMBODIMENTS

First Embodiment

Ink for Ink-Jet Recording

Figure 1A:
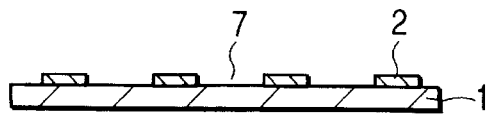
FIGS. 1A, 1B, 1C, 1D and 1E illustrate a flow chart of the process for producing a color filter of an embodiment of the present invention.

The ink for the ink-jet recording in an embodiment of the present invention contains a pyrazolone dye as a coloring material. This ink is suitably used, for example, as an ink for formation of green pixels of a color filter.

Pyrazolone Dye

Examples of the pyrazolone dye include the dyes having the structure of the structural formula (I):

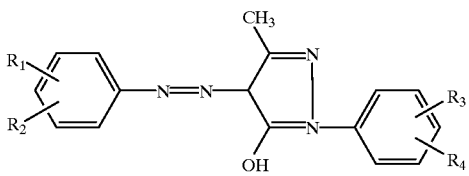

wherein $R_1$ and $R_2$ are each independently a hydrogen atom, an OH group, a halogen atom, a linear or branched alkyl group having 1 to 5 carbon atoms, a nitro group, a $CF_3$ group, or an $SO_3(M1)$ group; at least one of $R_1$ and $R_2$ is preferably a nitro group or a $CF_3$ group in consideration of the properties of green colored pixels; M1 is preferably an alkali metal such as Na, K and Li, or $NH_4$; both $R_3$ and $R_4$ are preferably an $SO_3(M2)$ group; and M2 is preferably an alkali metal such as Na, K and Li, or $NH_4$.

The two sulfonate groups as $R_3$ and $R_4$ improve the solubility of the pyrazolone dye in the ink to better improve the ink ejection stability.

In consideration of the aforementioned required characteristics (a) to (e), the pyrazolone dyes of the general formula (I) in which $R_1$ is $CF_3$ and $R_2$ is a hydrogen atom are preferable as a dye for formation of green pixels, since the dyes satisfy the above requirements for characteristics (a) to (e). As to M2 in $SO_3(M2)$ which constitutes $R_3$ and $R_4$ in the general formula (I) above, for example Na is preferable.

High quality color filters can be produced using solely the pyrazolone dye above as a single coloring material in an ink-jet system. However, another dye may be used in combination with the above pyrazolone dye, in responding to a required property of the color filter, as needed. An ink containing a combination of the pyrazolone dye and, for example, a phthalocyanine dye can produce a color filter having green pixels of a color tone different from that of the ink containing only a pyrazolone dye as the-coloring material. For example, the phthalocyanine dye of the general formula (II) can suitably be combined with the pyrazolone dye of the general formula (I) of the present invention without affecting the aforementioned characteristics (a) to (e) of the color filter.

A preferred dye which can be combined with the pyrazolone dye of the present invention is a phthalocyanine dye of the formula:

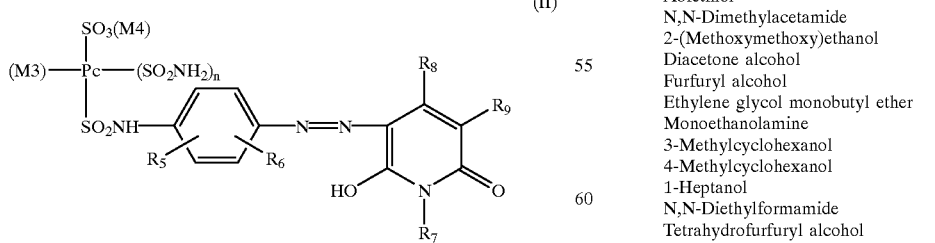

wherein Pc is a phthalocyanine residue; M3 is Cu, Zn or Ni; M4 is an alkali metal such as Na, K and Li, or $NH_4$; $R_5$ and $R_6$ are each independently an $SO_3(M5)$ group, a substituted or unsubstituted amide group (for example, $-NHCOCH_3$, $-NHCOC_2H_5$ and $-NHCOC_3H_7$), or a linear or branched alkyl group, for example, having 1 to 5 carbon atoms, M5 is an alkali metal such as Na, K and Li, or $NH_4$; $R_7$ and $R_8$ are each independently a linear or branched alkyl group, for example, having 1 to 5 carbon atoms; $R_9$ is $-CONHR_{10}$, $-COOH$, or $-COO(M6)$, where M6 is an alkali metal such as Na, K and Li, or $NH_4$; $R_{10}$ is a hydrogen atom, or a linear or branched alkyl group having 1 to 4 carbon atoms; and n is an integer of 0, 1 or 2.

In the combination of the pyrazolone dye of the general formula (I) and the phthalocyanine dye, the weight ratio is preferably in the range of from about 1:4 to about 4:1 in consideration of ink ejection characteristics and color filter properties.

The total amount of the dyes in the ink ranges preferably from 0.1 to 15% by weight, more preferably from 1 to 10% by weight, still more preferably from 2 to 8% by weight to obtain desirable optical properties of the pixels and to keep the properties of the ink suitable for precise ejection by ink-jet recording.

Aqueous media including water can be used for a medium constituting the ink, which keeps coloring matters in a dissolved state, a dispersed state or a dissolved and dispersed state. A content of water as a component in the aqueous medium ranges preferably from 10 to 90% by weight, more preferably from 20 to 80% by weight based on the total weight of the ink.

The aqueous medium may contain a water-soluble organic solvent. The solubility of components in an ink can be improved, and the viscosity of the ink can be adjusted by the use of a water-soluble organic solvent shown below. In particular, a water-soluble organic solvent having a boiling point ranging from about 150° C. to about 250° C. is suitably used since the possibility of occurrence of clogging of orifices can be decreased when ejecting the ink to deposit it on a base plate by an ink-jet recording system and also the adhesiveness to the base plate is not lowered. Table 1 shows examples of the useful water-soluble organic solvent.

TABLE 1

| Solvent | Boiling point (° C.) |
| --- | --- |
| N,N-Dimethyl formamide | 153 |
| 1-Methylcyclohexanol | 155 |
| 3-Heptanol | 156.2 |
| 2-Ethoxyethyl acetate | 156.3 |
| 1-Hexanol | 157.1 |
| 2-Heptanol | 160.4 |
| Cyclohexanol | 161 |
| 2-Furfurylaldehyde | 161.8 |
| N,N-Diethylethanolamine | 162.1 |
| 2-Methylcyclohexanol | 165 |
| Abietinol | 165 |
| N,N-Dimethylacetamide | 166.1 |
| 2-(Methoxymethoxy)ethanol | 167.5 |
| Diacetone alcohol | 168.1 |
| Furfuryl alcohol | 170 |
| Ethylene glycol monobutyl ether | 170.2 |
| Monoethanolamine | 171 |
| 3-Methylcyclohexanol | 173 |
| 4-Methylcyclohexanol | 173 |
| 1-Heptanol | 176.3 |
| N,N-Diethylformamide | 177 |
| Tetrahydrofurfuryl alcohol | 178 |
| 2-Octanol | 178 |
| N-Methyl formamide | 180 |
| Ethylene glycol monoisoamyl ether | 181 |
| 2,3-Butanediol | 182 |
| Ethylene glycol monoacetate | 182 |
| Glycerin monoacetate | 182 |

TABLE 1-continued

| Solvent | Boiling point (° C.) |
| --- | --- |
| 2-Ethyl-1-hexanol | 184.7 |
| 1,2-Propanediol | 187.3 |
| Dipropylene glycol monomethyl ether | 190 |
| Ethylene glycol diacetate | 190.2 |
| 1,2-Butanediol | 190.5 |
| Ethylene glycol monobutyl ether acetate | 191.5 |
| 3,5,5-Trimethyl-1-hexanol | 194 |
| Diethylene glycol monomethyl ether | 194.1 |
| 1-Octanol | 195 |
| 2-Methyl-2,4-pentanediol | 197.1 |
| Dipropylene glycol monomethyl ether | 197.8 |
| Ethylene glycol | 197.9 |
| N-Methylpyrrolidone | 202 |
| Diethylene glycol monoethyl ether | 202 |
| γ-Butyrolactone | 204 |
| Benzyl alcohol | 205.5 |
| N-Methylacetamide | 206 |
| 1,3-Butanediol | 207.5 |
| Ethylene glycol monohexyl ether | 208.5 |
| Formamide | 210.5 |
| 1,3-propanediol | 214 |
| 1-Nonanol | 214 |
| Diethylene glycol monoethyl ether acetate | 214.7 |
| α-Terpineol | 219 |
| Acetamide | 221.2 |
| 1,4-Butanediol | 229.2 |
| Diethylene glycol monobutyl ether | 230.4 |
| 1-Decanol | 231 |
| Dipropylene glycol | 231.8 |
| 2-Butene-1,4-diol | 235 |
| Ethylene carbonate | 238 |
| Propylene carbonate | 242 |
| 1,5-Pentanediol | 242.4 |
| 1-Undecanol | 243 |
| Tripropylene glycol monomethyl ether | 243 |
| 2-Ethyl-1,3-hexanediol | 243.2 |
| Ethylene glycol monophenyl ether | 244.7 |
| Diethylene glycol | 244.8 |
| 2-Pyrrolidone | 245 |
| Diethylene glycol monobutyl ether acetate | 246.8 |
| Triethylene glycol monomethyl ether | 249 |

The ink may contain a surfactant of a nonionic, anionic or cationic type. The ink may contain other additives such as a pH-controlling agent, a mildewproofing agent and the like, as needed.

Such a type of ink is suitably used for formation of a green pixel in which the ink is ejected through a recording head by ink-jet system, such as a bubble jet type employing an electrothermal transducer as the energy-generating element or a piezo jet type employing a piezo element, to deposit on a color filter base plate. The ink ejection property can be made excellent in particular when, at the time of ejection, the ink has a surface tension ranging from 30 to 68 dyn/cm and an ink viscosity not higher than 15 cP, preferably not higher than 10 cP, more preferably not higher than 5 cP, at 25° C. Specific ink compositions for achieving the desirable properties in this embodiment are shown later in Examples.

Production of Color Filter

The process for producing a color filter employing the aforementioned ink is described below.

FIGS. 1A to 1E illustrate a process for producing a color filter of an embodiment of the present invention.

FIG. 1A shows a base plate I on which a light-shielding portion 2 (hereinafter referred to as a "black matrix") is formed in the form of a pattern. In a case of forming the black matrix 2 on a base plate directly, there may be exemplified, for example, a process in which a thin film of a metal (e.g., chromium, and chromium oxide) is formed by sputtering or vapor deposition and subsequently patterning it by photolithography, or in a case of forming it on a resin composition, a process of patterning by a usual photolithography method is exemplified. Reference numeral 7 denotes a portion where light can be passed through.

Figure 1B:

A layer in which a curable resin composition is contained is formed on the base plate 1 having black matrix 2 formed thereon, thereby providing an ink-receiving layer 3 (FIG. 1B). The base plate employed is usually made of glass. However, any material other than glass may be used, so far as characteristics such as light transmittance and mechanical strength required commonly for the liquid crystal color filter can be satisfied. For example, a transparent acrylic resin can be used as the base plate.

An ink-receiving layer 3 may be formed from a conventional material. In consideration of heat resistance, acrylic resins, epoxy resins and imide resins are suitable. In consideration of absorbency for a water-based ink, it is preferable to use a resin containing a water-soluble cellulosic polymer such as hydroxypropyl cellulose, hydroxyethyl cellulose, methyl cellulose, and carboxymethyl cellulose. Besides, there may be mentioned also polyvinylpyrrolidone, polyvinyl alcohol, polyvinylacetal, polyurethane, and polyesters; and natural resins such as albumin, gelatin, casein, starch, cationic starch, gum arabic, and sodium alginate. In particular, in consideration of the aforementioned transparency and bleeding of colored portions, and light fastness of dyes in addition to the heat resistance and ink absorbency, preferred are mixtures of hydroxypropyl cellulose and a methylol-melamine resin, or polymers containing a homopolymer having the structural unit (III):

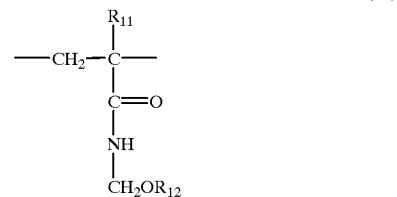

(III)

wherein $R_{11}$ is H or $CH_3$, $R_{12}$ is H or a linear or branched alkyl group which may be substituted by an alkyl having 1 to 5 carbon atoms; and/or a copolymer thereof with another vinyl monomer. Examples of the monomer corresponding to the above structural unit (III) include specifically N-methylolacrylamide, N-methoxymethylacrylamide, N-ethoxymethylacrylamide, N-isopropoxymethylacrylamide, N-methylolmethacrylamide, N-methoxymethylmethacrylamide and N-ethoxymethylmethacrylamide. Examples of the other vinyl monomer include acrylic acid, methacrylic acid, acrylates such as methyl acrylate and ethyl acrylate; methacrylates such as methyl methacrylate, ethyl methacrylate; hydroxyl group-containing vinyl monomers such as hydroxymethyl methacrylate, hydroxyethyl methacrylate, hydroxymethyl acrylate and hydroxyethyl acrylate; styrene, α-methylstyrene, acrylamide, methacrylamide, acrylonitrile, allylamine, vinylamine, vinyl acetate, and vinyl propionate. The copolymerization molar ratio of the monomer corresponding to the general formula (III) to the other vinyl monomer ranges preferably from 95:5 to 5:95.

The aforementioned ink-receiving layer 3 may contain additives, as needed. Examples of the additive include surfactants, dye-fixing agents (waterproofing agents), antifoaming agents, antioxidants, fluorescent whitening agents, UV absorbing agents, dispersants, viscosity-controlling agents, pH-controlling agents, mildew-proofing agents, and plasticizers. The additives may be selected arbitrarily from known compounds to meet the purpose.

The ink-receiving layer 3 can be formed by any coating method such as spin coating, roll coating, bar coating, spray coating, dip coating and the like. The layer may be prebaked, if necessary.

Figure 1C:
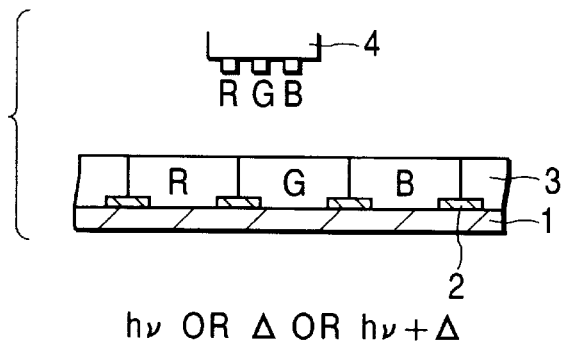
Figure 2:
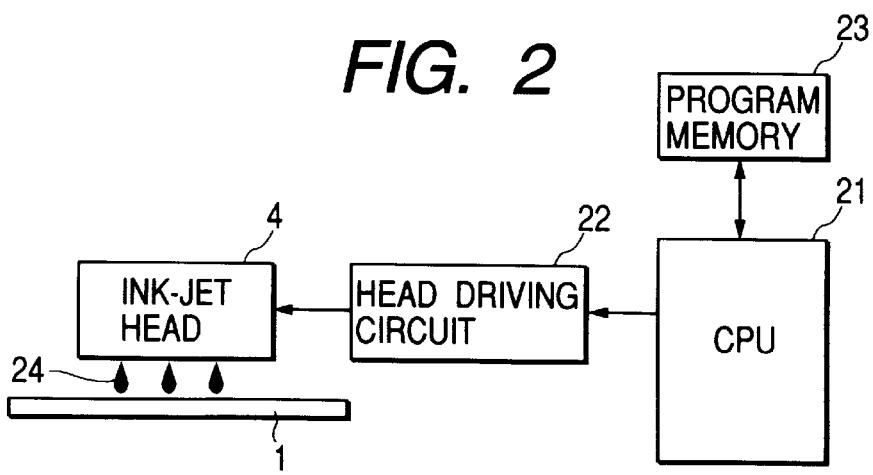
FIG. 2 illustrates a block diagram showing a constitution of an apparatus for forming pixels of a color filter by an ink-jet system.

In the next step, the aforementioned ink of the present invention is deposited on image formation portions by an ink-jet system to dye prescribed portions of the ink-receiving layer 3 (FIG. 1C). Reference numeral 4 denotes an ink-jet head comprising nozzles for R, G and B inks. The ink-jet system may be of a bubble jet type employing an electrothermal transducer as an energy-generating element, or of a piezo jet type employing a piezo element. The colored area and the colored pattern may be selected as desired. A preferable method for forming pixels by an ink-jet system is described below by reference to FIG. 2. FIG. 2 is a block diagram showing a constitution of an apparatus for forming colored portions of a color filter. In FIG. 2, a CPU 21 is connected through a head driving circuit 22 to an ink-jet head 4. The CPU 21 is so constituted that control program information in a program memory 23 is introduced. The CPU 21 drives an ink-jet recording head 4 to a prescribed pixel-forming position (not shown in the drawing) on the base plate 1 to bring the prescribed pixel position below the ink-jet head 4. An ink 24 of a prescribed color is ejected onto the position to color it. This operation is conducted throughout the desired pixel positions on the base plate 1 to produce a color filter.

When preparing a color filter having pixels of red (R), green (G) and blue (B), any conventional inks may be used for forming red and blue pixels. Pixels of R, G and B are respectively formed by dyeing prescribed portions of an ink-receiving layer 3, simultaneously or successively, using such conventional red and blue inks with the green ink of the present invention.

Figure 1D:
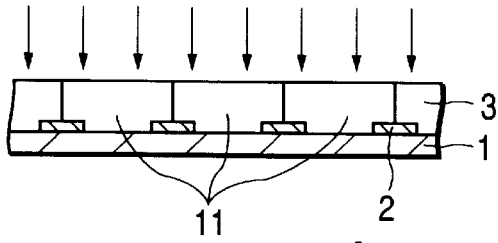

In the subsequent step, the ink-receiving layer 3 is cured (FIG. 1D). The curing treatment may be conducted by a method suitable for a curable resin used in the ink-receiving layer. For example, the ink-receiving layer is cured by heating or light irradiation or a combination of heating and light irradiation to form respective colored pixels 11. The light irradiation intensity ranges preferably from about 1 to about 3,000 mJ/cm$^2$. The heat treatment can be conducted by means of an oven, a hot plate, or the like at a temperature ranging from 150° C. to 250° C. for a time ranging from 1 minute to 120 minutes.

Figure 1E:
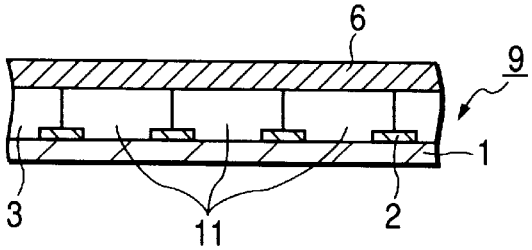

Further, a protection layer 6 is formed on the cured ink-receiving layer 3 as necessary (FIG. 1E). The protection layer 6 can be formed by applying a resin material, which is curable by light irradiation or a heat treatment, and curing subsequently, or by vapor-depositing an inorganic film or sputtering. As to the material of the protection layer, materials that do not impair its transparency, which is required for the color filter, when they are made into a protection layer and that are capable of withstanding the later process such as an ITO formation process or an orientation film formation process, are suitably used. Examples of the material include acrylic resins such as epoxy acrylates, urethane acrylates and the like as an organic material; and SiO$_2$ and the like as an inorganic material.

In such a manner, the color filter 9 of FIG. 1E of this embodiment can be prepared.

Second Embodiment

A second embodiment of the color filter of the present invention is described below. This embodiment is different from the first embodiment in the point that portions corresponding to a black matrix 2 on an ink-receiving layer 3 are cured prior to application of an ink to an ink-receiving layer 3 to lower the ink absorbency in advance. This embodiment is explained along with the steps in the production process by reference to FIGS. 4A to 4F.

Figure 4A:
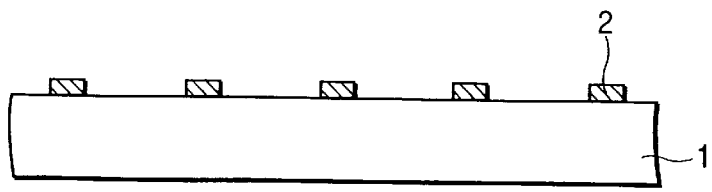
FIGS. 4A, 4B, 4C, 4D, 4E and 4F illustrate a flow chart of the process for producing a color filter of another embodiment of the present invention.
Figure 4B:
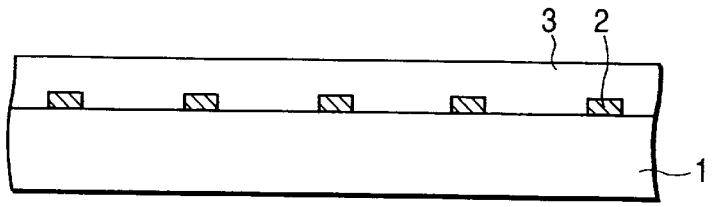

First, a base plate 1 is provided which has a black matrix 2 formed on the surface thereof, in the same manner as in the first embodiment (FIG. 4A). Thereon, an ink-receiving layer 3 is formed so as to cover the black matrix 2 (FIG. 4B). It is preferable to use a material for the ink-receiving layer 3 which lowers its ink absorbency at the surface by light irradiation.

As to the material for constituting the ink-receiving layer 3 in this embodiment, there can be suitably used materials in which a photopolymerization initiator is additionally incorporated into the aforementioned materials for the ink-receiving layer 3 of the first embodiment. Examples of the photopolymerization initiator include onium salts and halogenated triazine compounds. The onium salts are specifically exemplified by triphenylsulfonium hexafluoroantimonate, triphenylsulfonium tetrafluoroborate, triphenylsulfonium hexafluorophosphate, triphenylsulfonium trifluoromethylsulfonate, and derivatives thereof; and diphenyliodonium hexafluoroantimonate, diphenyliodonium tetrafluoroborate, diphenyliodonium hexafluorophosphate, diphenyliodonium trifluoromethylsulfonate, and derivatives thereof. Of these, halogenated triazine compounds and derivatives thereof are preferred. The amount of the photopolymerization initiator to be incorporated in the ink-receiving layer material ranges from 0.01 to 20% by weight, preferably from 0.1 to 10% by weight. There may be added thereto compounds such as perylene, anthracene and the like as a sensitizer.

Figure 4C:
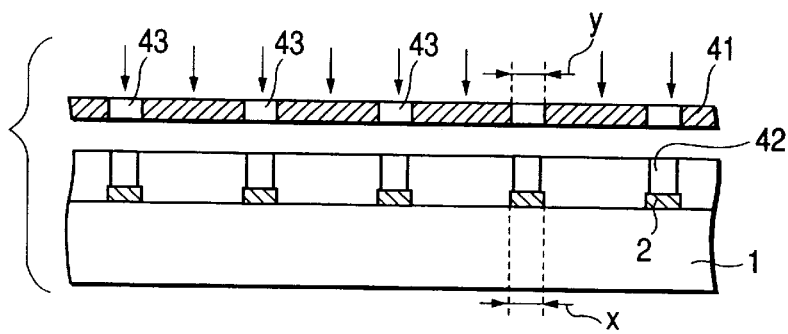
Figure 4D:
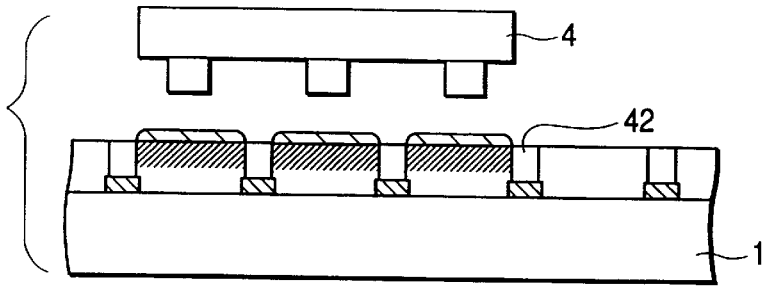
Figure 4E:
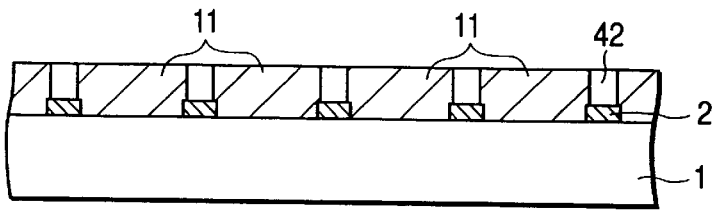
Figure 4F:
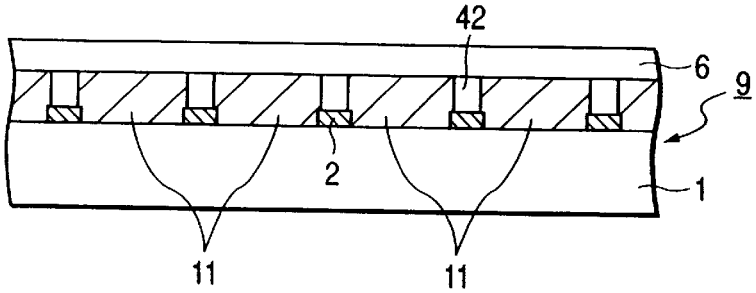

In the subsequent step, the portion corresponding to the black matrix 2 of the ink-receiving layer 3 is cured by selective exposure to light, for example, by use of a photo mask 41 (FIG. 4C). Thereby, a portion having less ink-absorbency (portion not to be colored) 42 is formed selectively on the ink-receiving layer 3. The photo mask 41 for the light pattern exposure has openings 43 for selective light irradiation of the portions of the ink-receiving layer corresponding to the black matrix 2. The width (y) of the openings 43 is preferably smaller than the width (x) of the black matrix 2. In the formation of a color filter by this method, a slightly excess amount of the ink is applied to the region where pixels of the ink receiving layer are formed, for the sake of preventing undesirable occurrence of coloring failure on the borders between the black matrix 2 and the pixels. Therefore, the width of the portion not to be colored of the ink-receiving layer 3 is preferably made smaller than the width (x) of the black matrix 2. Thus the portions not to be colored can be formed by the use of the black photo mask 41 having the width (y) of the openings 43 smaller than the width (x) of the black matrix 2. The light of irradiation onto the ink-absorption layer for formation of non-colored portions 43 is not specially limited, but the intensity thereof is preferably in the range of from about 1 to about 3,000 mJ/cm$^2$. The heat treatment can be conducted at a temperature ranging from 150° C. to 250° C. for 1 minute to 120 minutes by means of an oven, a hot plate or the like.

Subsequent steps (FIGS. 4D to 4F) are conducted by applying the ink onto portions where pixels are to be formed by means of an ink-jet method and curing the ink-receiving layer 3 in the same manner as shown in FIGS. 1C to 1E, thereby producing a color filter The method of this Embodiment prevents troubles caused by color mixing and color irregularity at the border between pixels, in particular between adjacent pixels, in formation of R, G and B pixels by an ink-jet system, and enables production of high-quality color filters at a low production cost.

Third Embodiment

A third embodiment of the present invention is described below according to the following production steps with reference to FIGS. 5A to 5D. This embodiment has one feature in the point that the color filter is prepared without providing an ink-receiving layer 3.

First, a base plate 1 is provided which has a black matrix 2 formed on the surface thereof (FIG. 5A), in the same manner as in the first embodiment. In this embodiment, walls of a prescribed thickness (e.g., 0.5 μm or more) are preferably formed between the pixels. Preferably therefor, a black resin resist is patterned to form a black matrix 2.

Figure 5A:
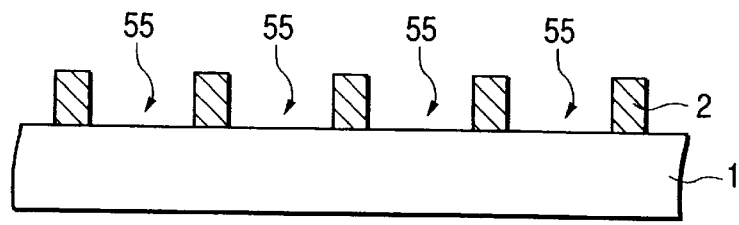
FIGS. 5A, 5B, 5C and 5D illustrate a flow chart of the process for producing a color filter of still another embodiment of the present invention.
Figure 5B:
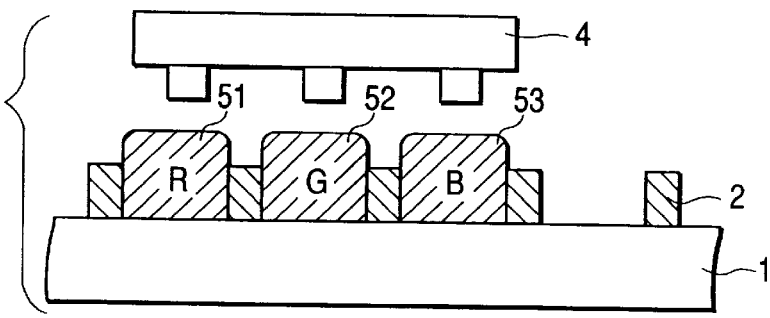

Then, as shown in FIG. 5B, the aforementioned green ink 52 of the present invention, a conventional R ink 51 and a conventional B ink 53 are applied to fill light-transmissive portions 55 between the black matrices 2 by utilizing an ink-jet system. In this operation, preferably the inks are applied so as not to cause overlap of the different color inks on black matrix 2.

Ink Composition

The G ink for forming green pixels employed in this embodiment may be the aforementioned ink containing a pyrazolone dye. However, it is in particular preferable to use a G ink comprising a resin which is curable by energy application such as light irradiation or heating or a combination of light irradiation and heating. The R ink and the B ink preferably also each contain the above resin.

Curable Resin Component in the Ink, and its Content

As to the aforementioned resin there may be used various commercially available resins or hardeners. However, it is preferable to use one which does not cause troubles such as solidification and the like before use. Examples of the resins include acrylic resins, epoxy resins and melamine resins. The component curable by light, heat or both light and heat is contained in the ink in an amount, for example, ranging from 0.1 to 20% by weight based on the total weight of the ink.

Figure 5C:
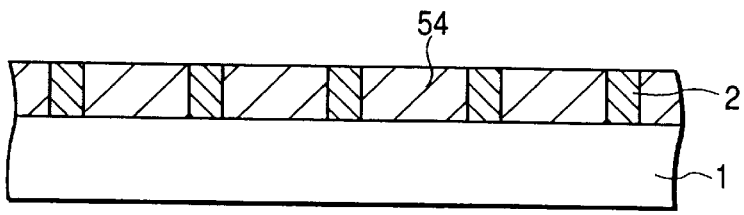
Figure 5D:
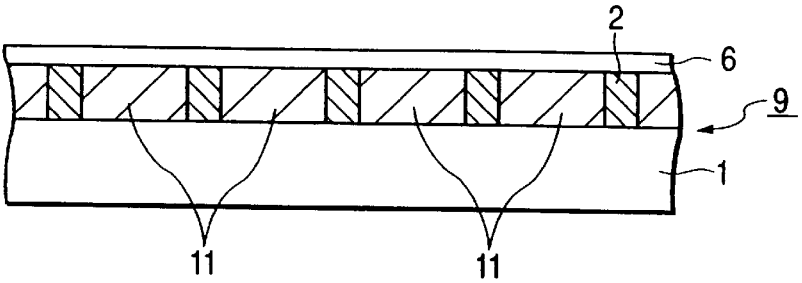

In the subsequent step, the inks applied to the openings 55 of FIG. 5A on the base plate 1 are partially cured by light irradiation, heating or both light irradiation and heating, as shown in FIG. 5C. Then, a curable resin composition is applied so as to cover both the black matrix 2 and colored portions 54 formed by the color inks, as shown in FIG. 5D. The coated matter is subjected to light irradiation and/or heating treatment to cure the colored portions 54 to complete colored pixels 11 and to cure the curable resin composition to form simultaneously a protection layer 6, thereby obtaining a color filter 9. The protection layer 6 can be formed as above by curing a curable resin by light irradiation, heat treatment or a combination of light irradiation and heat treatment. Otherwise, the protection layer 6 may be formed from an inorganic film by vapor deposition or sputtering. The material of the protection film 6 is preferably transparent as a color filter, and is capable of withstanding the subsequent steps such as ITO formation, orientation film formation and the like.

Liquid Crystal Panel

Figure 6:
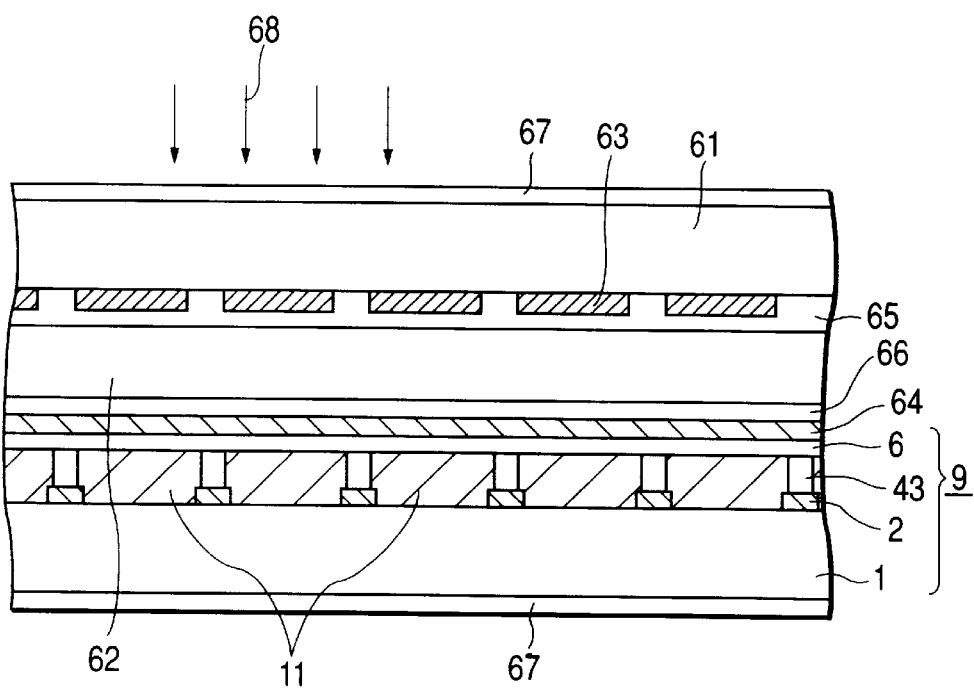
FIG. 6 is a schematic sectional view of a liquid crystal panel of an embodiment of the present invention.
Figure 7:
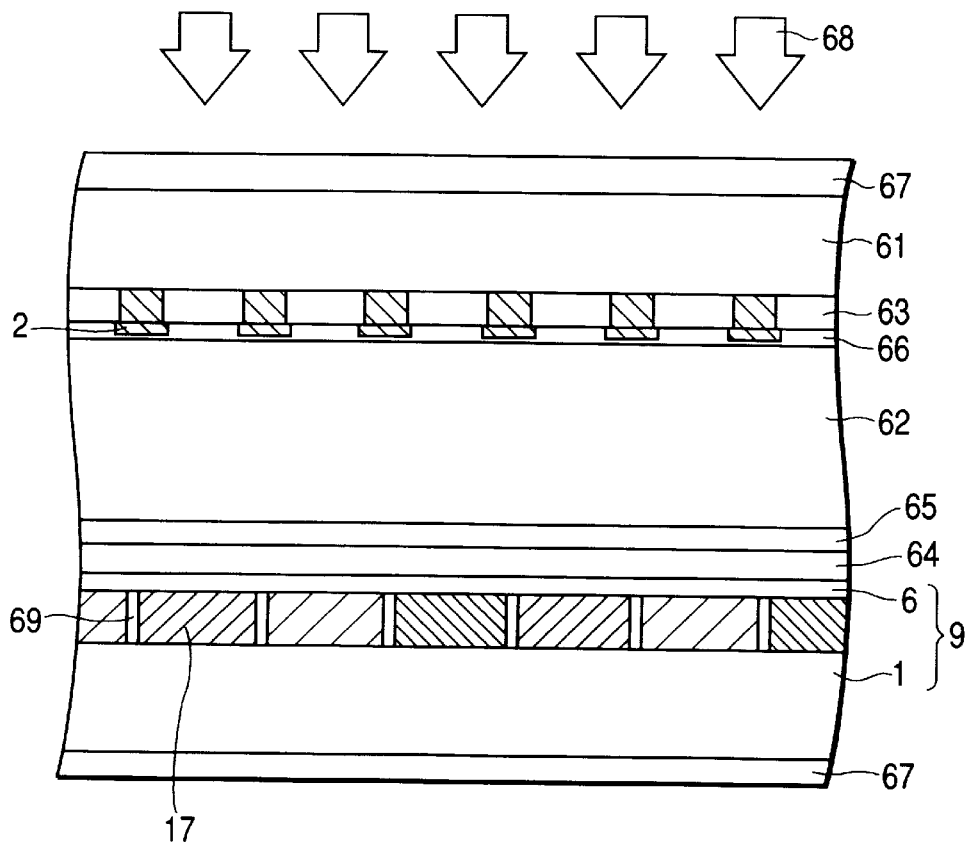
FIG. 7 is a schematic sectional view of a liquid crystal panel of another embodiment of the present invention.
Figure 8:
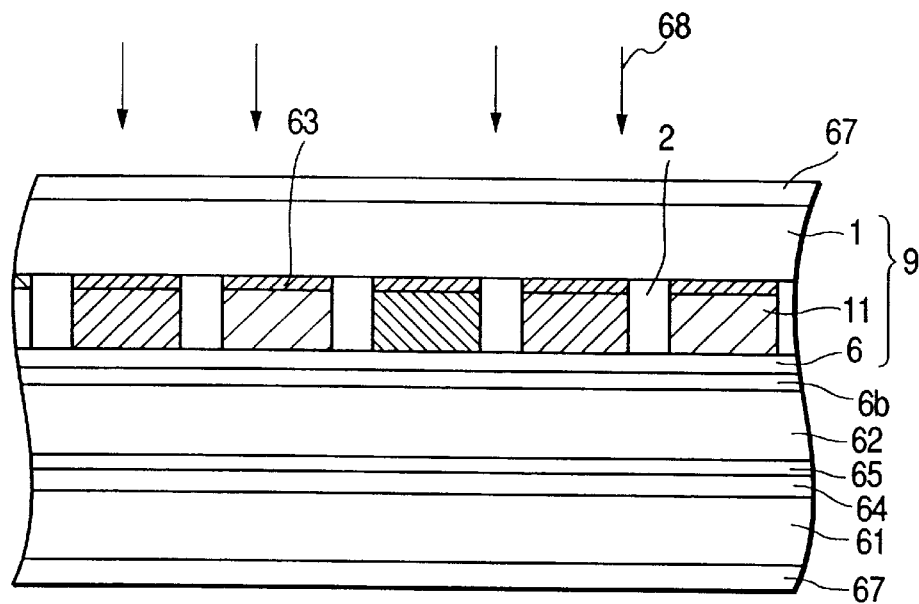
FIG. 8 is a schematic sectional view of a liquid crystal panel of still another embodiment of the present invention.

The color filter 9 formed in the respective embodiments above is used for constituting a liquid crystal panel. For example, a color filter 9 and a base plate 61 are placed in opposition as shown in FIG. 6, and a liquid crystal composition 62 is charged therebetween to form a liquid crystal panel. FIG. 6 is a sectional view of a TFT color liquid crystal panel having a color filter of the present invention. Thus, a color liquid crystal panel is formed by putting together the color filter 9 and the base plate 61 in opposition and filling the liquid crystal composition 62 therebetween. On the inside face of one of the base plates of the liquid crystal panel, there are formed a TFT (not shown in the drawing) and transparent pixel electrodes 63 in a matrix state. A counter (common) electrode 64 is formed on the entire face of a protection layer 6 of the color filter 9. An orientation film 65 is formed on the inside face of the counter base plate 61 so as to cover the pixel electrodes 63. Another orientation film 66 is also formed on the inside face of the counter base plate 64. The orientation films after rubbing treatment can align the liquid crystal molecules in one direction. For use of the liquid crystal panel prepared as above for a display device, polarizing plates 67 are bonded outside the color filter base plate 1 and the counter base plate 61. The liquid crystal panel conducts display by utilizing the liquid crystal as a light shutter for changing the transmittance of light 68 from a back light source which is generally a combination of a fluorescent lamp and a light-scattering plate. The black matrix 2, and the colored portions 11 are usually formed on the color filter base plate side as shown in FIG. 6. However, in a liquid crystal panel of a black matrix (BM) of an on-array type, the BM is formed on the TFT base plate side reverse to the BM as shown in FIG. 7. In a liquid crystal panel of the color filter (CF) of the on-array type, the CF is formed on the TFT base plate side in opposition to the BM as shown in FIG. 8. Reference numerals in FIGS. 7 and 8 have the same meaning as in FIG. 6. Reference numeral 43 in FIG. 6 denotes a portion having less ink absorbency, and reference numerals 17 and 69 in FIG. 7 denote a colored pixel and a black matrix, respectively.

Figure 9:
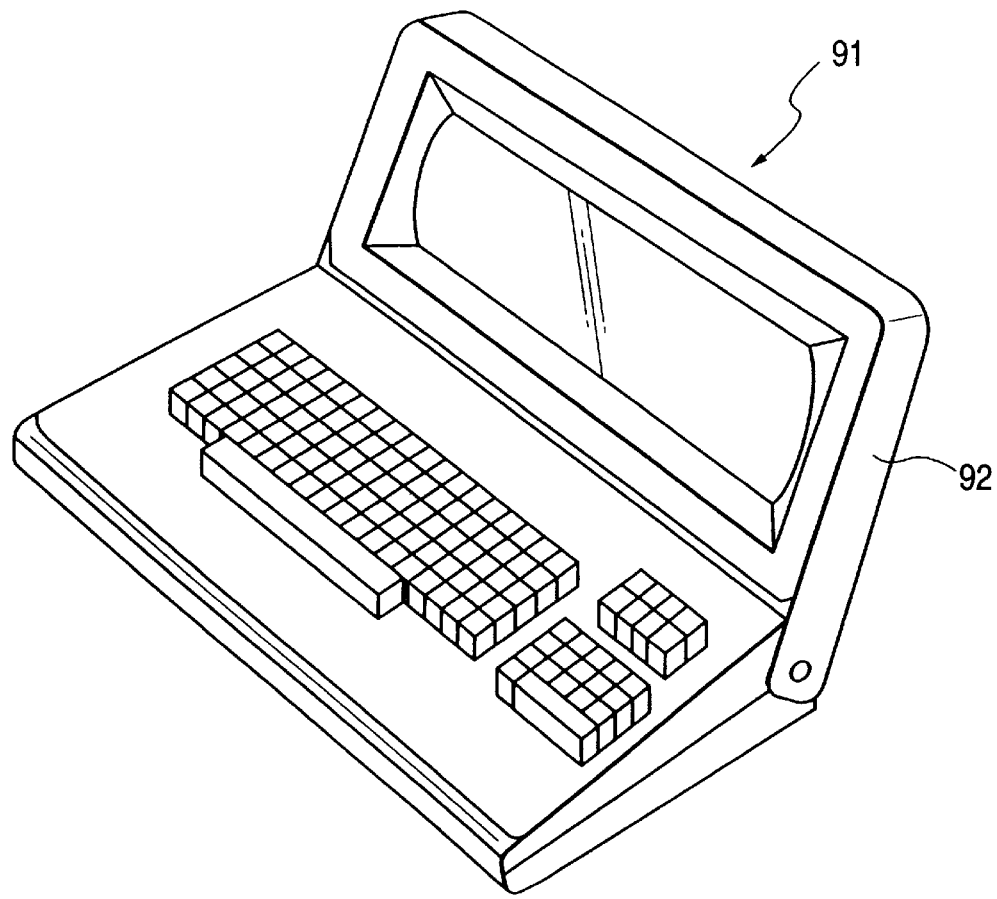
FIG. 9 is a schematic perspective view of a computer of an embodiment of the present invention.

The liquid crystal panel prepared in such a process can be used as an image display device 92 of a computer 91 or the like as shown in FIG. 9.

The embodiments of the present invention are described below more specifically.

Examples 1 to 8

A glass base plate was provided which had a black matrix made of chromium having openings in a size ranging from 60 to 150 μm. On this glass base plate, a curable resin composition composed of a copolymer of N-methylolacrylamide and hydroxyethyl methacrylate in a ratio of 50:50 by weight was applied in a film thickness of 1.2 μm by spin coating, and prebaked at 120° C. for 20 minutes to form an ink-receiving layer.

Eight G inks were prepared by using a combination of any one of pyrazolone dyes A1 to A8 shown in Table 2 and a phthalocyanine dye of the formula (IV) according to Formulation 1 for G Ink below. R Ink was prepared by using C.I. Direct Red 80 as the dye, and B Ink was prepared by using C.I. Acid Blue 83 as the dye according to Formulation 1 for R and B Inks.

(IV)

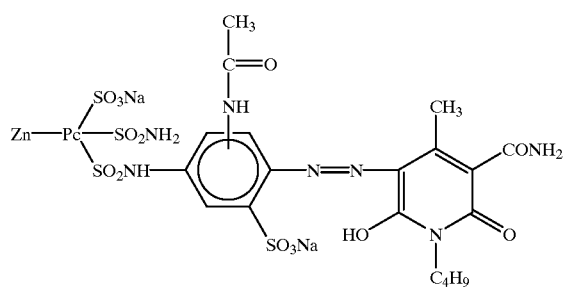

wherein Zn-Pc is a zinc-phthalocyanine residue.

TABLE 2

|  | $R_1$ | $R_2$ | $R_3$ | $R_4$ |
|---|---|---|---|---|
| A1 | $CF_3$ | H | $SO_3Na$ | $SO_3Na$ |
| A2 | $CF_3$ | $CF_3$ | $SO_3Na$ | $SO_3Na$ |
| A3 | $NO_2$ | H | $SO_3Na$ | $SO_3Na$ |
| A4 | $NO_2$ | $NO_2$ | $SO_3Na$ | $SO_3Na$ |
| A5 | Cl | H | $SO_3Na$ | $SO_3Na$ |
| A6 | Cl | Cl | $SO_3Na$ | $SO_3Na$ |
| A7 | OH | H | $SO_3Na$ | $SO_3Na$ |
| A8 | $SO_3Na$ | H | $SO_3Na$ | $SO_3Na$ |
| A9 | $CF_3$ | H | $SO_3Na$ | H |
| A10 | $NO_2$ | H | $SO_3Na$ | H |
| A11 | Cl | H | $SO_3Na$ | H |
| A12 | Cl | Cl | $SO_3Na$ | H |
| A13 | $SO_3Na$ | H | $SO_3Na$ | H |
| A14 | C.I. Acid Yellow 73 | | | |

The G Ink comprising pyrazolone dye A1, the R Ink and the B Ink were applied to portions where pixels of the respective colors were to be formed by an ink-jet printer to color the matrix pattern in R, B and G. The colored matter was then subjected to a baking treatment at 230° C. for 50 minutes to cure the applied inks. After drying, a two-pack type acrylic thermosetting resin material (SS-7625, trade name, produced by Japan Synthetic Rubber Co.) was applied thereto in a thickness of 1 μm by spin coating. The coated matter was heat treated at 240° C. for 20 minutes to cure the resin. Thus, the color filter for a liquid crystal display device of Example 1 was prepared.

Separately, color filters for a liquid crystal display device of Examples 2 to 8 were prepared respectively in the same manner as above except that G Ink was changed to G Inks comprising pyrazolone dyes A2 to A8, respectively.

The color filters of Examples 1 to 8 for a liquid crystal display device were evaluated. The G Inks comprising one of pyrazolone dyes A1 to A8, respectively, were evaluated for ink-jet ejection stability. The evaluation standards and the evaluation results are shown in Table 3.

Ink Formulation 1 for G Ink

| Pyrazolone dye: | 3% by weight |
|---|---|
| Phthalocyanine dye: | 2.7% by weight |
| Ethylene glycol monobutyl ether (bp 170° C.): | 39% by weight |
| Ethyl alcohol (bp 78° C.): | 6% by weight |
| Water | 49.3% by weight |

-continued

Ink Formulation 1 for R and B Inks

| Dye: | 5.7% by weight |
|---|---|
| Ethylene glycol monobutyl ether (bp 170° C.): | 39% by weight |
| Ethyl alcohol (bp 78° C.): | 6% by weight |
| Water | 49.3% by weight |

Evaluation Method

Evaluation 1

Transparency of Colored Portion

A liquid crystal panel was prepared with the above color filter. The transparency of the G pattern portions was evaluated visually on three evaluation grades:

A: Transparency being excellent;
B: Transparency being slightly lower; and
C: Cloudy in comparison with A and B Evaluation 2

Bleeding of Colored Portions

The color filter was left standing at 60° C. for 48 hours. The degree of bleeding (increase of the color portion area) of the G pattern was evaluated. The bleeding of the G pattern portions was evaluated on three evaluation grades:

A: Less than 5%;
B: 5% or higher, but not more than 10%; and
C: 10% or higher.

Evaluation 3

Adhesiveness of Colored Portion to Base Plate

The color filter was subjected to a pressure cooker treatment under conditions of temperature of 125° C. and humidity of 85% for 6 hours. After the treatment, the state of the G pattern portions was observed by microscopy. The adhesiveness of the G pattern portions was evaluated on three evaluation grades:

A: No problem;
B: Wrinkles formed; and
C: Colored portions separated from base plate.

Evaluation 4

Ejection Stability of G Ink

G Ink was set to a printer, BJ-10 (trade name, a product of Canon Inc.), and a character pattern was printed on 300 paper sheets of A4 size. The 300th printed paper sheet was examined visually. The ejection stability of the G Ink was evaluated on three evaluation grades:

A: No problem,
B: Slight blur observed, and
C: Ink ejection failed.

Evaluation 5

Light Fastness

The color filter was exposed to xenon light for 50 hours by means of Fade-o-Meter Model Ci35, (trade name, manufactured by Atlas Co.). Then the degree of discoloration of G pattern portions was calculated as ΔE (color difference) according to CIE. The light fastness of the R pattern portions was evaluated on three grades:

A: ΔE being 10 or lower,
B: ΔE being higher than 10, but 20 or lower, and
C: ΔE being higher than 20.
Evaluation results are shown in Table 3.

TABLE 3

| Example No. | Evaluation item | | | | |
|---|---|---|---|---|---|
| | 1 | 2 | 3 | 4 | 5 |
| 1 | A | A | A | A | A |
| 2 | A | A | A | A | A |
| 3 | A | A | A | A | B |
| 4 | A | A | A | A | B |
| 5 | B | A | A | A | B |
| 6 | B | A | A | A | B |
| 7 | A | A | A | A | B |
| 8 | A | A | B | A | B |

Comparative Examples 1 to 6

Color filters for liquid crystals were produced in the same manner as in Examples 1 to 8 except that th pyrazolone dye in the G Ink was replaced by the dyes A9 to A14 in Table 2, respectively. Evaluation results are shown in Table 4.

TABLE 4

| Comparative Example No. | Evaluation item | | | | |
|---|---|---|---|---|---|
| | 1 | 2 | 3 | 4 | 5 |
| 1 | A | A | A | C | A |
| 2 | B | A | A | C | B |
| 3 | C | A | A | C | B |
| 4 | C | A | A | C | B |
| 5 | A | C | B | A | B |
| 6 | B | B | C | A | C |

Examples 9 to 16

On a glass base plate, a black matrix of 1.0 μm thick was formed by applying a photosensitive resin containing a black pigment (Black Pigment Resist CK-S171B, trade name, produced by Fuji Hunt K.K.) by spin coating, and subjecting the resin to pattern light exposure, development, and heat treatment. Into the predetermined openings of the black matrix, R Ink, G Ink and B Ink were respectively injected by an ink-jet printer. The inks were cured by heat treatment at 230° C. for 30 minutes to form a color filter for a liquid crystal element. The compositions of the Inks were shown below as Ink Formulation 2 for G Ink, and Ink Formulation 2 for R and B Inks.

Coloring matter of R ink: C.I. Direct Red 80

Coloring matter of B ink: C.I. Acid Blue 83

Coloring matter of G ink:

Dye combinations respectively composed of a pyrazolone dye selected from the dyes A1 to A8 in Table 2, and the phthalocyanine dye of the structural formula (IV).

Ink Formulation 2 for G Ink Dye:

| Pyrazolone dye: | 3.0% by weight |
| Phthalocyanine dye: | 2.7% by weight |
| Acrylic copolymer of monomer composition | 3.0% by weight |

-continued below:
| N-Methylolacrylamide | 20 parts by weight |
| N,N-Dimethylaminoethyl methacrylate | 10 parts by weight |
| Methyl methacrylate | 25 parts by weight |
| 2-Hydroxyethyl methacrylate | 40 parts by weight |
| Acrylic acid | 5 parts by weight |
| Ethylene glycol monobutyl ether (bp 170° C.): | 36.0 % by weight |
| Ethyl alcohol (bp 78° C.): | 6.0 % by weight |
| Water: | 49.3 % by weight |

Ink Formulation 2 (R ,B)

| Dye: | 5.7% by weight |
| Acrylic copolymer of monomer composition below: | 3.0% by weight |
| N-Methylolacrylamide | 20 parts by weight |
| N,N-Dimethylaminoethyl methacrylate | 10 parts by weight |
| Methyl methacrylate | 25 parts by weight |
| 2-Hydroxyethyl methacrylate | 40 parts by weight |
| Acrylic acid | 5 parts by weight |
| Ethylene glycol monobutyl ether (bp 170° C.): | 36.0% by weight |
| Ethyl alcohol (bp 78° C.): | 6.0% by weight |
| Water: | 49.3% by weight |

Evaluation Methods

Evaluation 1

Transparency of Colored Portion

Liquid crystal panels were prepared with the above color filters. The transparency of the G pattern portions was evaluated visually on three grades:

A: Transparency being excellent,

B: Transparency being slightly lower, and

C: Cloudy in comparison with A and B.

Evaluation 2

Uniformity of Colored Portions

The color filters were examined by microscopy. The uniformity of the G pattern portions was evaluated on three grades:

A: Uniform,

B: Some white blank portions observed, and

C: Entirely white blank occurred.

Evaluation 3

Adhesiveness of Colored Portion to Base Plate

The color filter was subjected to a pressure cooker treatment under the conditions of 125° C. and 85% for 6 hours. After the treatment, the state of the G pattern portions was observed by microscopy. The adhesiveness of the G pattern portions was evaluated on three grades:

A: No problem,

B: Wrinkles observed, and

C: Colored portions separated from base plate.

Evaluation 4

Ejection stability of G Ink

The G Ink was set to a printer, BJ-10 (trade name, a product of Canon Inc), and a character pattern was printed on 300 paper sheets of A4 size. The 300th printed paper sheet was examined visually. The ejection stability of the G Ink was evaluated on three grades:

A: No problem,

B: Slight blur observed, and

C: Ink ejection failed.

Evaluation 5

Light Fastness

The color filter was exposed to xenon light for 50 hours by means of Fade-o-Meter Model Ci35 (trade name, manufactured by Atlas Co.). Then the degree of discoloration was represented by ΔE (color difference) according to CIE. The light fastness of the G pattern portions was evaluated on three grades:

A: ΔE being 10 or lower,

B: ΔE being higher than 10, but 20 or lower, and

C: ΔE being higher than 20.

Evaluation results are shown in Table 5.

TABLE 5

| Example | Evaluation item | | | | |
|---|---|---|---|---|---|
| No. | 1 | 2 | 3 | 4 | 5 |
| 9 | A | A | A | A | A |
| 10 | A | A | A | A | A |
| 11 | A | A | A | A | B |
| 12 | A | A | A | A | B |
| 13 | B | A | A | B | B |
| 14 | B | A | A | B | B |
| 15 | A | A | A | A | B |
| 16 | A | A | B | A | B |

Comparative Examples 7 to 12

Color filters were produced in the same manner as in Examples 9 to 16 except that the pyrazolone dyes A1 A8 in the G ink were replaced by the compound selected from the dye A9 to A14 in Table 2, respectively. Evaluation results are shown in Table 6.

TABLE 6

| Comparative Example | Evaluation item | | | | |
|---|---|---|---|---|---|
| No. | 1 | 2 | 3 | 4 | 5 |
| 7 | A | B | A | C | A |
| 8 | B | B | A | C | B |
| 9 | C | B | A | C | B |
| 10 | C | C | A | C | B |
| 11 | C | B | B | A | B |
| 12 | B | B | C | A | C |

Examples 17 to 24

G Inks were prepared with the pyrazolone dyes A1 to A8 of Table 2 according to Formulation 3 below. The G Ink was set to an ink-jet printer BJC-620 (trade name, manufactured by Canon Inc). Solid printing was conducted on an OHP film sheet (CF-102, trade name, produced by Canon Inc.).

Ink Formulation 3

| | |
|---|---|
| Pyrazolone dye | 5.0% by weight |
| Ethylene glycol (bp 197° C.) | 20.0% by weight |
| Ethyl alcohol (bp 78° C.) | 4.0% by weight |
| water | 71.0% by weight |

Evaluation Method

Evaluation 1

Suitability for OHP

A printed image was projected by an OHP onto a screen. The projected image was examined visually. An ink which could form a projected image having a clear recorded area high in optical density and in contrast was evaluated as a grade A. An ink which formed a projected image with a little lower optical density with some darkness was evaluated as a grade B. An ink which formed a projected image with significant darkness and a low optical density, without sharpness was evaluated as a grade C.

Evaluation B

Uniformity of Solid Print Area

An ink which formed a printed image with significant beading visually, and formed a projected image with significant irregularity was evaluated as a grade C. An ink which formed a printed image with slight beading was evaluated as a grade B. An ink which formed a printed image without beading and formed a projected image with uniformity was evaluated as a grade A. In the present invention, the term "bleeding" means the phenomenon such that the adjacent deposited dots spread irregularly on the ink-receiving layer to form assemblage of dots to cause image density irregularity owing to a fluidity of the ink before complete fixation to the ink-receiving layer.

Evaluation 3

Image Storability

The printed images, which were recorded on recording media using Inks above, respectively, by means of the printer above, were stored under the environmental conditions of temperature of 35° C. and humidity of 90% for 7 days. Printed images before and after storage were compared. An ink which caused a remarkably lowered image quality after storage due to the occurrence of ink spreading, ink bleeding or gain in letter (i.e., spreading ink makes the printed letter or line thick and blurred), as compared with that before storage was evaluated as a grade C. An ink which did not cause the above phenomenon was evaluated as a grade A. An ink between the above grade A and grade C was evaluated as a grade B. Evaluation results are shown in Table 7.

TABLE 7

| Example No. | Evaluation item | | |
|---|---|---|---|
| | 1 | 2 | 3 |
| 17 | A | A | A |
| 18 | A | A | A |
| 19 | A | B | A |
| 20 | A | B | A |
| 21 | A | B | A |
| 22 | A | B | A |
| 23 | A | A | B |
| 24 | A | A | B |

Comparative Examples 13 to 16

A solid printing was conducted on an OHP film sheet under the same conditions as in Examples 17 to 24 except that the pyrazolone dyes A1 to A8 were replaced respectively by the compounds A9 to A14 in Table 2. Evaluation results are shown In Table 8.

TABLE 8

| Comparative Example No. | Evaluation item | | |
|---|---|---|---|
| | 1 | 2 | 3 |
| 13 | B | C | A |
| 14 | B | C | B |
| 15 | B | C | B |
| 16 | B | C | B |
| 17 | A | A | C |
| 18 | B | B | C |

According to the present invention, a color panel can be produced simply with the ink containing the aforementioned dye by use of an ink-jet system. An ink comprising the dye of the present invention satisfies the requirements for the characteristics of transparency of the pixels, no bleeding, adhesiveness to the base plate, and high ejectability. The ink is useful for uses other than the color filter such as business printers, and industrial printers.

What is claimed is:

1. An ink for ink-jet recording, comprising a pyrazolone dye of the general formula (I):

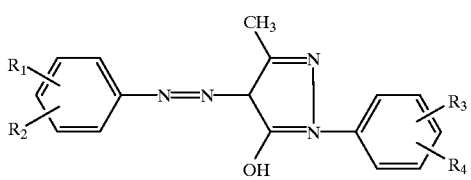

(I)

wherein $R_1$ and $R_2$ are independently selected from the group consisting of a hydrogen atom, an OH group, a halogen atom, a linear or branched alkyl group having 1 to 5 carbon atoms, a nitro group, a $CF_3$ group and an $SO_3(M1)$ group, where M1 is an alkali metal or $NH_4$; at least one of $R_1$ and $R_2$ is a $CF_3$ group; and both $R_3$ and $R_4$ are an $SO_3(M2)$ group, where M2 is an alkali metal or $NH_4$.

2. The ink according to claim 1, wherein in the pyrazolone dye of the general formula (I), $R_1$ is a $CF_3$ group and $R_2$ is a hydrogen atom.

3. An ink for ink-jet recording, comprising a pyrazolone dye of the general formula (I):

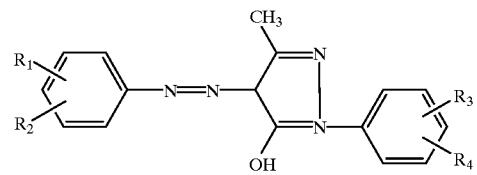

(I)

wherein $R_1$ and $R_2$ are independently selected from the group consisting of a hydrogen atom, an OH group, a halogen atom, a linear or branched alkyl group having 1 to 5 carbon atoms, a nitro group, a $CF_3$ group and an $SO_3(M1)$ group, where M1 is an alkali metal or $NH_4$; both $R_3$ and $R_4$ are an $SO_3(M2)$ group, where M2 is an alkali metal or $NH_4$; and wherein the ink further comprises a phthalocyanine dye.

4. An ink for ink-jet recording, comprising a pyrazolone dye of the general formula (I):

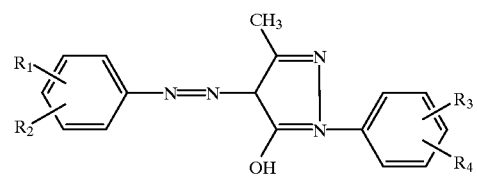

(I)

wherein $R_1$ and $R_2$ are independently selected from the group consisting of a hydrogen atom, an OH group, a halogen atom, a linear or branched alkyl group having 1 to 5 carbon atoms, a nitro group, a $CF_3$ group and an $SO_3(M1)$ group, where M1 is an alkali metal or $NH_4$; both $R_3$ and $R_4$ are an $SO_3(M2)$ group, where M2 is an alkali metal or $NH_4$;

wherein at least one of $R_1$ and $R_2$ in the pyrazolone dye of the general formula (I) is a nitro group; and wherein the ink further comprises a phthalocyanine dye.

5. An ink for ink-jet recording, comprising a pyrazolone dye of the general formula (I):

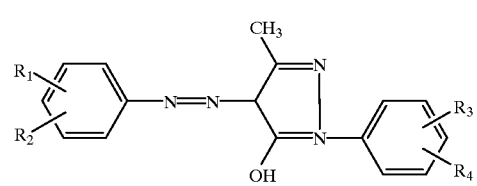

(I)

wherein $R_1$ and $R_2$ are independently selected from the group consisting of a hydrogen atom, an OH group, a halogen atom, a linear or branched alkyl group having 1 to 5 carbon atoms, a nitro group, a $CF_3$ group and an $SO_3(M1)$ group, where M1 is an alkali metal or $NH_4$; both $R_3$ and $R_4$ are an $SO_3(M2)$ group, where M2 is an alkali metal or $NH_4$;

wherein at least one of $R_1$ and $R_2$ in the pyrazolone dye of the general formula (I) is a $CF_3$ group; and wherein the ink further comprises a phthalocyanine dye.

6. An ink for ink-jet recording, comprising a pyrazolone dye of the general formula (I):

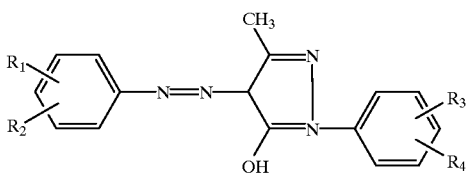

wherein $R_1$ and $R_2$ are independently selected from the group consisting of a hydrogen atom, an OH group, a halogen atom, a linear or branched alkyl group having 1 to 5 carbon atoms, a nitro group, a $CF_3$ group and an $SO_3(M1)$ group, where M1 is an alkali metal or $NH_4$; both $R_3$ and $R_4$ are an $SO_3(M2)$ group, where M2 is an alkali metal or $NH_4$;
wherein in the pyrazolone dye of the general formula (I), $R_1$ is a $CF_3$ group and $R_2$ is a hydrogen atom; and
wherein the ink further comprises a phthalocyanine dye.

7. The ink according to claim 3, 4, 5 or 6, wherein the phthalocyanine dye has a structure of the general formula (II):

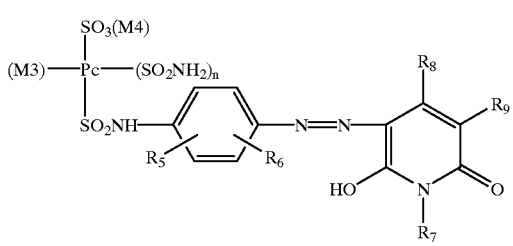

wherein Pc is a phthalocyanine residue; M3 is Cu, Zn or Ni; $R_5$ and $R_6$ are each independently an $SO_3(M5)$ group, a substituted or unsubstituted amide group, or a substituted or unsubstituted alkyl group; $R_7$ and $R_8$ are each independently a substituted or unsubstituted alkyl group; $R_9$ is —$CONHR_{10}$, —COOH or —COO(M6); $R_{10}$ is a hydrogen atom, or a substituted or unsubstituted alkyl group; n is an integer of 0, 1 or 2; M4, M5 and M6 are each independently an alkali metal or $NH_4$.

8. The ink according to claim 1, 3, 4, 5 or 6, wherein the ink comprises the dyes at a total concentration ranging from 0.1 to 15% by weight based on the total weight of the ink.

9. The ink according to claim 1, 3, 4, 5 or 6, wherein the ink comprises a solvent having a boiling point ranging from 150° C. to 250° C. at a concentration ranging from 5 to 50% by weight based on the total weight of the ink.

10. The ink according to claim 1, 3, 4, 5 or 6, wherein the ink comprises further a curable resin.

11. The ink according to claim 10, wherein the curable resin is curable by at least one of light irradiation and heat application.

12. A process for producing a color filter provided with colored pixels on a light-transmissive base plate, comprising the steps of:
ejecting an ink set forth in claim 10 on a light-transmissive base plate by an ink-jet system to deposit the ink on prescribed points on the surface of the base plate, and
curing the curable resin contained in the ink to form colored pixels.

13. A process for producing a color filter provided with colored pixels on a light-transmissive base plate, comprising the step of:
ejecting an ink set forth in claim 1, 3, 4, 5 or 6 onto the light-transmissive base plate by an ink-jet system to deposit the ink on prescribed points, thereby forming at least one of the colored pixels there.

14. The process for producing a color filter according to claim 13, wherein the light-transmissive base plate has a curable resin layer on the surface thereof.

15. The process for producing a color filter according to claim 14, wherein a material for forming the resin layer is a polymer comprising a water-soluble acrylic monomer unit.

16. The process for producing a color filter according to claim 14, wherein a material for forming the resin layer comprises a cellulosic water-soluble polymer.

17. The process for producing a color filter according to claim 14, comprising further the step of:
curing the resin layer after the ink is deposited on the resin layer.

18. The process for producing a color filter according to claim 13, wherein the light-transmissive base plate has a light-shielding layer to separate the colored pixels.

19. The process for producing a color filter according to claim 18, wherein the surface of the light-shielding layer is noncolorable.

20. The process for producing a color filter according to claim 18, wherein a colorable resin layer is formed between the light-shielding layers.

21. The process for producing a color filter according to claim 13, wherein the light-transmissive base plate has a light-shielding layer which separates colored pixels formed on the surface of the base plate from each other and a resin layer formed on the light-shielding layer, the surface of the resin layer on the light-shielding layer being noncolorable.

22. The process for producing a color filter according to claim 13, wherein the process further comprises the steps of:
forming a curable resin layer so as to cover the colored pixels, and
curing the curable resin.

23. The process for producing a color filter according to claim 22, wherein the curable resin is cured by applying at least one of light energy and heat energy.

24. A color filter comprising:
a light-transmissive base plate; and
a colored pixel at prescribed positions on the base plate, wherein the colored pixel comprises a pyrazolone dye of the general formula (I):

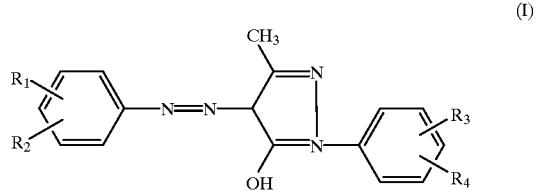

wherein $R_1$ and $R_2$ are each independently selected from the group consisting of a hydrogen atom, an OH group, a halogen atom, a linear or branched alkyl group having 1 to 5 carbon atoms, a nitro group, a $CF_3$ group and an $SO_3(M1)$ group, where M1 is an alkali metal or $NH_4$; at least one of $R_1$ and $R_2$ is a $CF_3$ group; and both $R_3$ and $R_4$ are an $SO_3(M2)$ group, where M2 is an alkali metal or $NH_4$.

25. The color filter according to claim 24, wherein in the pyrazolone dye of the general formula (I), $R_1$ is a $CF_3$ group and $R_2$ is a hydrogen atom.

26. A color filter comprising:
a light-transmissive base plate; and
colored pixels at prescribed positions on the base plate, wherein at least one of the colored pixels comprises a pyrazolone dye of the general formula (I):

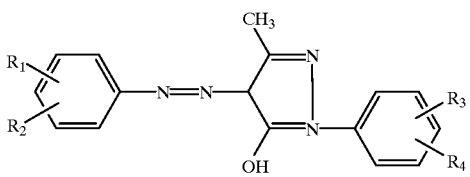
(I)

wherein $R_1$ and $R_2$ are each independently selected from the group consisting of a hydrogen atom, an OH group, a halogen atom, a linear or branched alkyl group having 1 to 5 carbon atoms, a nitro group, a $CF_3$ group and an $SO_3(M1)$ group, where M1 is an alkali metal or $NH_4$; at least one of $R_1$ and $R_2$ is a $CF_3$ group; and both $R_3$ and $R_4$ are an $SO_3(M2)$ group, where M2 is an alkali metal or $NH_4$.

27. The color filter according to claim 26, wherein the pyrazolone dye of the general formula (I), $R_1$ is a $CF_3$ group and $R_2$ is a hydrogen atom.

28. A color filter comprising:
a light-transmissive base plate; and
a colored pixel at prescribed positions on the base plate, wherein the colored pixel comprises a pyrazolone dye of the general formula (I):

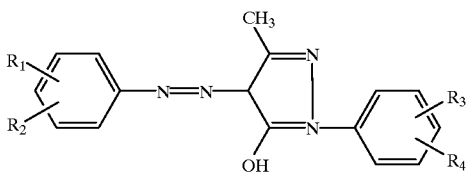
(I)

wherein $R_1$ and $R_2$ are each independently selected from the group consisting of a hydrogen atom, an OH group, a halogen atom, a linear or branched alkyl group having 1 to 5 carbon atoms, a nitro group, a $CF_3$ group and an $SO_3(M1)$ group, where M1 is an alkali metal or $NH_4$; both $R_3$ and $R_4$ are an $SO_3(M2)$ group, where M2 is an alkali metal or $NH_4$;
wherein the colored pixel comprising the pyrazolone dye further comprises a phthalocyanine dye.

29. The color filter according to claim 28, wherein the phthalocyanine dye has a structure of the general formula (II):

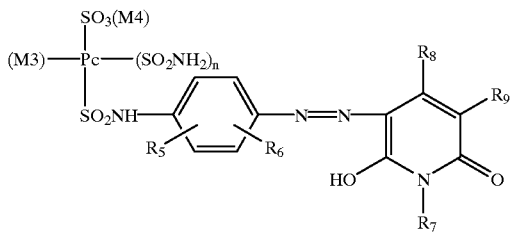
(II)

wherein Pc is a phthalocyanine residue; M3 is Cu, Zn or Ni; $R_5$ and $R_6$ are each independently an $SO_3(M5)$ group, a substituted or unsubstituted amide group, or a substituted or unsubstituted alkyl group; $R_7$ and $R_8$ are each independently a substituted or unsubstituted alkyl group; $R_9$ is $-CONHR_{10}$, $-COOH$ or $-COO(M6)$; $R_{10}$ is a hydrogen atom or a substituted or unsubstituted alkyl group; n is an integer of 0, 1 or 2; M4, M5 and M6 are each independently an alkali metal or $NH_4$.

30. A color filter comprising:
a light-transmissive base plate; and
colored pixels at prescribed positions on the base plate, wherein at least one of the colored pixels comprises a pyrazolone dye of the general formula (I):

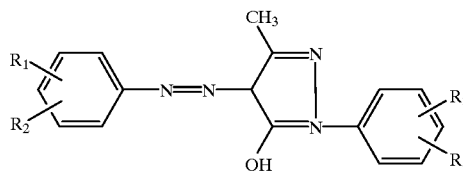
(I)

wherein $R_1$ and $R_2$ are each independently selected from the group consisting of a hydrogen atom, an OH group, a halogen atom, a linear or branched alkyl group having 1 to 5 carbon atoms, a nitro group, a $CF_3$ group and an $SO_3(M1)$ group, where M1 is an alkali metal or $NH_4$; both $R_3$ and $R_4$ are an $SO_3(M2)$ group, where M2 is an alkali metal or $NH_4$;
wherein the colored pixel comprising the pyrazolone dye further comprises a phthalocyanine dye.

31. The color filter according to claim 30, wherein the phthalocyanine dye has a structure of the general formula (II):

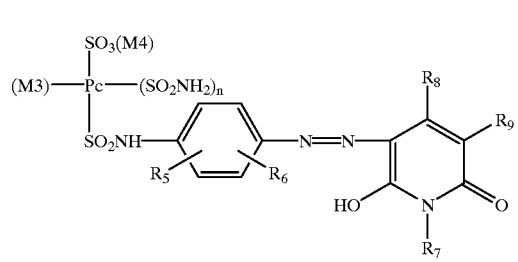
(II)

wherein Pc is a phthalocyanine residue; M3 is Cu, Zn or Ni; $R_5$ and $R_6$ are each independently an $SO_3(M5)$ group, a substituted or unsubstituted amide group, or a substituted or unsubstituted alkyl group; $R_7$ and $R_8$ are each independently a substituted or unsubstituted alkyl group; $R_9$ is $-CONHR_{10}$, $-COOH$ or $-COO(M6)$; $R_{10}$ is a hydrogen atom or a substituted or unsubstituted alkyl group; n is an integer of 0, 1 or 2; M4, M5 and M6 are each independently an alkali metal or $NH_4$.

32. The color filter according to claim 24, 26, 25, 27, 28, 30, 29 or 31, wherein the base plate has a resin layer on the surface thereof, and the resin layer constitutes the colored pixels.

33. The color filter according to claim 26, 27, 30, or 31, wherein the colored pixels are separated from each other, and a light-shielding layer is provided between respective colored pixels.

34. The color filter according to claim 33, wherein the light-shielding layer has a noncolorable surface.

35. The color filter according to claim 26, 27, 30, or 31, wherein the colored pixels are separated from each other; a light-shielding layer and a resin layer covering the light-shielding layer are provided between the colored pixels; and the surface of the resin layer on the light-shielding layer is noncolorable.

36. A liquid crystal panel comprising:
    a color filter set forth in claim 24, 26, 28 or 30,
    a panel base plate placed in opposition to the color filter, and
    a liquid crystal compound enclosed between the color filter and the panel base plate.

37. A computer provided with the liquid crystal panel set forth in claim 36 as an image display device.

* * * * *

UNITED STATES PATENT AND TRADEMARK OFFICE
CERTIFICATE OF CORRECTION

PATENT NO.     : 6,248,482 B1
DATED          : June 19, 2002
INVENTOR(S)    : Akio Kashiwazaki et al.

It is certified that error appears in the above-identified patent and that said Letters Patent is hereby corrected as shown below:

Title page,
Item [56], References Cited, FOREIGN PATENT DOCUMENTS,
"8211219      8/1996  (JP)" should be deleted.
"9291240" should read -- 9-291240 --.

Column 2,
Line 50, "have" should read -- has --.

Column 3,
Line 49, "light transmissive" should read -- light-transmissive --.

Column 5,
Line 42, "the-coloring" should read -- the coloring --.

Column 6,
Line 63, "N-Methyl formamide" should read -- N-Methylformamide --.

Column 15,
Line 22, "th" should read -- the --.

Column 16,
Line 64, "Canon Inc)," should read -- Canon Inc.), --.

Column 17,
Line 42, "A1 A8" should read -- A1 to A8 --.
Line 66, "Canon Inc)." should read -- Canon Inc.). --.

Signed and Sealed this

Twenty-second Day of October, 2002

Attest:

Attesting Officer

JAMES E. ROGAN
*Director of the United States Patent and Trademark Office*